United States Patent
Kaidu (10) Patent No.: US 11,296,641 B2
(45) Date of Patent: Apr. 5, 2022

(54) MOTOR DRIVE CONTROL APPARATUS, MOTOR DRIVE SYSTEM, AND METHOD FOR CONTROLLING MOTOR DRIVE CONTROL APPARATUS

(71) Applicant: MINEBEA MITSUMI Inc., Nagano (JP)

(72) Inventor: Hiroyuki Kaidu, Kakegawa (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/116,042

(22) Filed: Dec. 9, 2020

(65) Prior Publication Data

US 2021/0203262 A1     Jul. 1, 2021

(30) Foreign Application Priority Data

Dec. 27, 2019  (JP) .............................. JP2019-239251

(51) Int. Cl.
*H02P 27/08* (2006.01)
*H02P 27/06* (2006.01)
*F04D 25/06* (2006.01)

(52) U.S. Cl.
CPC .............. *H02P 27/06* (2013.01); *F04D 25/06* (2013.01)

(58) Field of Classification Search
CPC ........ H02P 27/06; F04D 25/06; F04D 27/004; F04D 25/166
See application file for complete search history.

(56) References Cited

U.S. PATENT DOCUMENTS

| | | | |
|---|---|---|---|
| 2011/0031906 A1* | 2/2011 | Yasohara | H02P 5/74 318/66 |
| 2013/0221886 A1* | 8/2013 | Matsumoto | B60W 10/20 318/400.17 |
| 2015/0162858 A1* | 6/2015 | Wajima | H02P 6/04 318/494 |
| 2017/0279387 A1* | 9/2017 | Kaidu | H02P 6/182 |
| 2018/0159456 A1* | 6/2018 | Kato | H02P 6/04 |
| 2018/0241327 A1* | 8/2018 | Wang | H02P 6/18 |
| 2018/0248499 A1* | 8/2018 | Kaidu | H02P 21/14 |
| 2019/0288626 A1* | 9/2019 | Yamada | H02P 25/024 |

FOREIGN PATENT DOCUMENTS

JP         2001-286187 A    10/2001

* cited by examiner

*Primary Examiner* — Muhammad S Islam
(74) *Attorney, Agent, or Firm* — Pearne & Gordon LLP (57) ABSTRACT

A motor drive control apparatus includes a receiving unit configured to receive a target rotation frequency outputted to a motor to be a drive control target of a predetermined plurality of motors from a host apparatus and receive stability information indicating that actual rotation frequencies of the predetermined plurality of motors are stabilized, an advance angle/duty determination unit configured to adjust a drive control signal to control driving of the motor to be a drive control target so that a motor current becomes minimum at the target rotation frequency when the stability information is received, a duty setting unit, an advance angle control unit, a energization controlling unit and a motor drive unit configured to drive the motor to be the drive control target based on the drive control signal.

7 Claims, 5 Drawing Sheets

MOTOR DRIVE CONTROL APPARATUS, MOTOR DRIVE SYSTEM, AND METHOD FOR CONTROLLING MOTOR DRIVE CONTROL APPARATUS

CROSS REFERENCE TO RELATED APPLICATIONS

This application claims the benefit of Japanese Patent Application No. 2019-239251, filed Dec. 27, 2019, which is hereby incorporated by reference in its entirety.

BACKGROUND

Technical Field

The present disclosure relates to a motor drive control apparatus, a motor drive system, and a method for controlling the motor drive control apparatus.

Background

There are motor drive systems that control a plurality of motor drive control apparatuses using one control apparatus and drive motors connected to the respective motor drive control apparatuses. An example of such motor drive systems is one that is used for an electric device system, drives a plurality of fan motors disposed in various parts of an electric device using one control apparatus and cools the electric device (e.g., see Japanese Patent Application Laid-Open No. 2001-286187).

Japanese Patent Application Laid-Open No. 2001-286187 describes a configuration of an electric device system including a plurality of fan motor control units configured to control fan motors and a system control unit configured to control an electric device system, in which the system control unit and the plurality of fan motor control units perform data communication to thereby control the plurality of fan motors.

As a method for driving a motor used in a fan motor with high efficiency, a method is available for adjusting an advance angle value and a drive duty of a drive control signal for driving the motor within a range in which the rotation frequency is not changed while measuring a motor current. According to the method, it is possible to make an adjustment so as to minimize the motor current at the same rotation frequency.

However, in the case of, for example, a server apparatus with a plurality of fan motors disposed in a closed space to cool an electronic device, the respective fan motors are affected by winds from other fan motors. Under the influences of the winds from the other fan motors, load fluctuations in the fan motors increase.

When load fluctuations are large, depending on timing at which motor currents of individual fan motors are measured, even if a combination of an advance angle value and a drive duty corresponding to optimum efficiency for the timing is determined to have been obtained, the measured motor current values may actually be inappropriate. For example, in the case where motor currents are measured at timing with a heavier load than a normal load, even when the combination of the advance angle value and the drive duty which corresponds to optimum efficiency is obtained at the time of measurement, the motor currents may be higher than the motor currents measured and obtained with the combination of the advance angle value and the drive duty with the normal load. As a result, the motor may not be driven with optimum efficiency in this case.

The present disclosure is related to providing a motor drive control apparatus, a motor drive system, and a method for controlling the motor drive control apparatus capable of optimizing drive efficiency of a plurality of motors even when the motors are driven simultaneously.

SUMMARY

In accordance with one aspect of the present disclosure, a motor drive control apparatus includes a rotation frequency instruction receiving unit configured to receive a target rotation frequency outputted to a motor to be a drive control target among a predetermined plurality of motors from a host apparatus, a stability information receiving unit configured to receive stability information indicating that actual rotation frequencies of the predetermined plurality of motors are stabilized, a motor current adjustment unit configured to adjust, when the stability information is received, a drive control signal to control driving of the motor to be the drive control target so that the motor current becomes minimum at the target rotation frequency and a motor drive unit configured to drive the motor to be the drive control target based on the drive control signal.

In the above motor drive control apparatus, the rotation frequency stability information may be transmitted from the host apparatus as a current adjustment enable signal to enable the motor drive control apparatus to adjust the drive control signal so as to minimize the motor current.

In the above motor drive control apparatus, the motor current adjustment unit may adjust the drive control signal so as to minimize the motor current within a predetermined time upon receipt of the current adjustment enable signal.

In the above motor drive control apparatus, when the motor current adjustment unit acquires an adjustment end instruction for requesting the end of adjusting the drive control signal from the host apparatus, the motor current adjustment unit may end the adjustment of the drive control signal.

In the above motor drive control apparatus, the motor current adjustment unit may include an advance angle/duty determination unit configured to determine a predetermined advance angle value and a duty ratio adjusted to be the target rotation frequency corresponding to the target rotation frequency as a combination of the advance angle value and the duty ratio of the drive control signal until the stability information is received and determine a combination of the advance angle value and the duty ratio of the drive control signal when the motor current becomes minimum at the target rotation frequency when the stability information is received, and a drive control signal generation unit configured to generate the drive control signal based on the combination of the advance angle value and the duty ratio of the determined drive control signal.

In accordance with another aspect of the present disclosure, a motor drive system is provided with a predetermined plurality of motors, any of the above motor drive control apparatuses provided for the predetermined plurality of motors respectively and a host apparatus including a rotation frequency instruction unit configured to output a target rotation frequency of the motor to be the drive control target of the motor drive control apparatus to the motor drive control apparatus.

In the above motor drive system, the host apparatus includes a stability determination unit configured to request actual rotation frequency information from the motor drive control apparatuses of the predetermined plurality of motors and determine, when all the actual rotation frequencies of the predetermined plurality of motors acquired in response to the request fall within a predetermined numerical value range with respect to the target rotation frequency of each motor, that the actual rotation frequencies of the predetermined plurality of motors are stabilized and a current adjustment enabling unit configured to generate a current adjustment enable signal to sequentially enable the drive control signals to be adjusted so as to minimize the motor current for the motor drive control apparatuses of the predetermined plurality of motors when the stability determination unit determines that the actual rotation frequencies of the predetermined plurality of motors are stabilized.

In accordance with yet another aspect of the present disclosure, the method for controlling the motor drive control apparatus is a method for controlling the motor drive control apparatus according to any of the embodiments including a rotation frequency instruction reception step of receiving a target rotation frequency outputted to a motor to be a drive control target among a predetermined plurality of motors from a host apparatus, a stability information reception step of receiving stability information indicating that actual rotation frequencies of the predetermined plurality of motors are stabilized, a motor current adjustment step of adjusting, after the stability information reception step, a drive control signal to control driving of the motor to be the drive control target so that the motor current becomes minimum at the target rotation frequency and a motor drive step of driving the motor to be the drive control target based on the drive control signal.

According to the motor drive control apparatus, the motor drive system, and the method for controlling the motor drive control apparatus of the present disclosure, it is possible to optimize drive efficiency of each of the plurality of motors to be driven simultaneously.

DETAILED DESCRIPTION

Hereinafter, specific examples of embodiments of the present disclosure will be described with reference to the accompanying drawings. Note that in the following description, components common to the respective embodiments are assigned the same reference numerals and duplicate description is omitted.

EMBODIMENTS

First, a motor drive control apparatus, a motor drive system and a method for controlling the motor drive control apparatus according to the present embodiment will be described.

Figure 1:
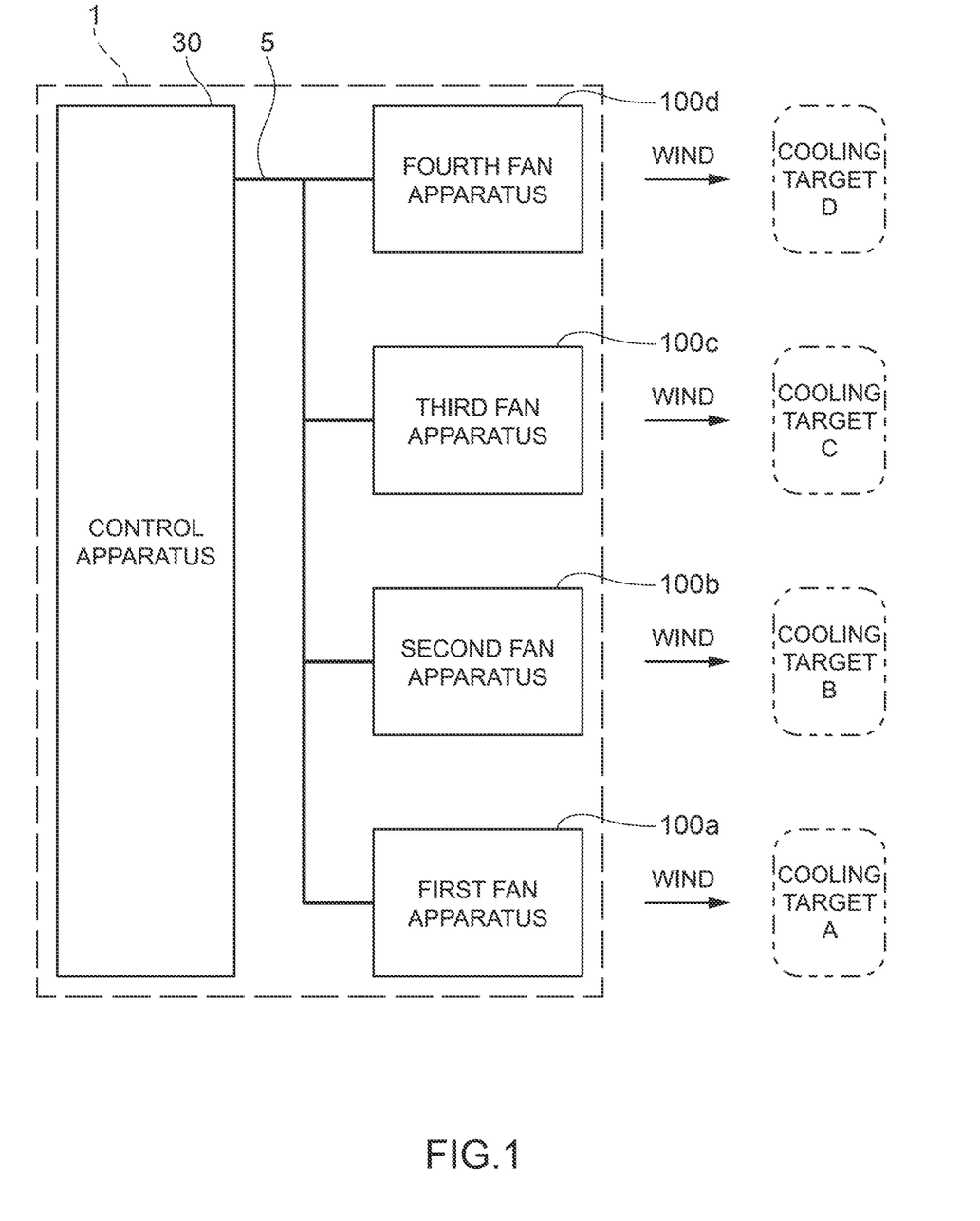
FIG. 1 is a schematic configuration diagram illustrating an example of a motor drive system 1 according to an embodiment.

FIG. 1 is a schematic configuration diagram illustrating an example of a motor drive system 1 according to an embodiment. FIG. 1 shows a server apparatus in which a plurality of fan motors are arranged in a closed space to cool electronic devices as a specific example of the motor drive system 1. As shown in FIG. 1, the motor drive system 1 is constructed of four fan apparatuses 100a to 100d provided for four cooling targets A, B, C and D, a control apparatus (an example of a host apparatus) 30 configured to output target rotation frequencies of motors to be drive control targets to the four fan apparatuses 100a to 100d (also generically called a "fan apparatus 100") and a communication line 5 connecting the four fan apparatuses 100a to 100d and the control apparatus 30.

Although the motor drive system 1 including motors used to rotate an impeller 101 (see FIG. 2) in the fan apparatus 100 is described as an example of the motor drive system 1 in this embodiment, it may also be the motor drive system 1 including motors used for other purposes. Note that although the communication line 5 is shown with a wireline in FIG. 1, the communication between the four fan apparatuses 100a to 100d and the control apparatus 30 may also be wireless communication. Although a case where the four fan apparatuses 100 are connected to the control apparatus 30 will be described, the number of fan apparatuses 100 to be connected to the control apparatus 30 may be two or more, and the number of fan apparatuses 100 is not limited.

Figure 2:
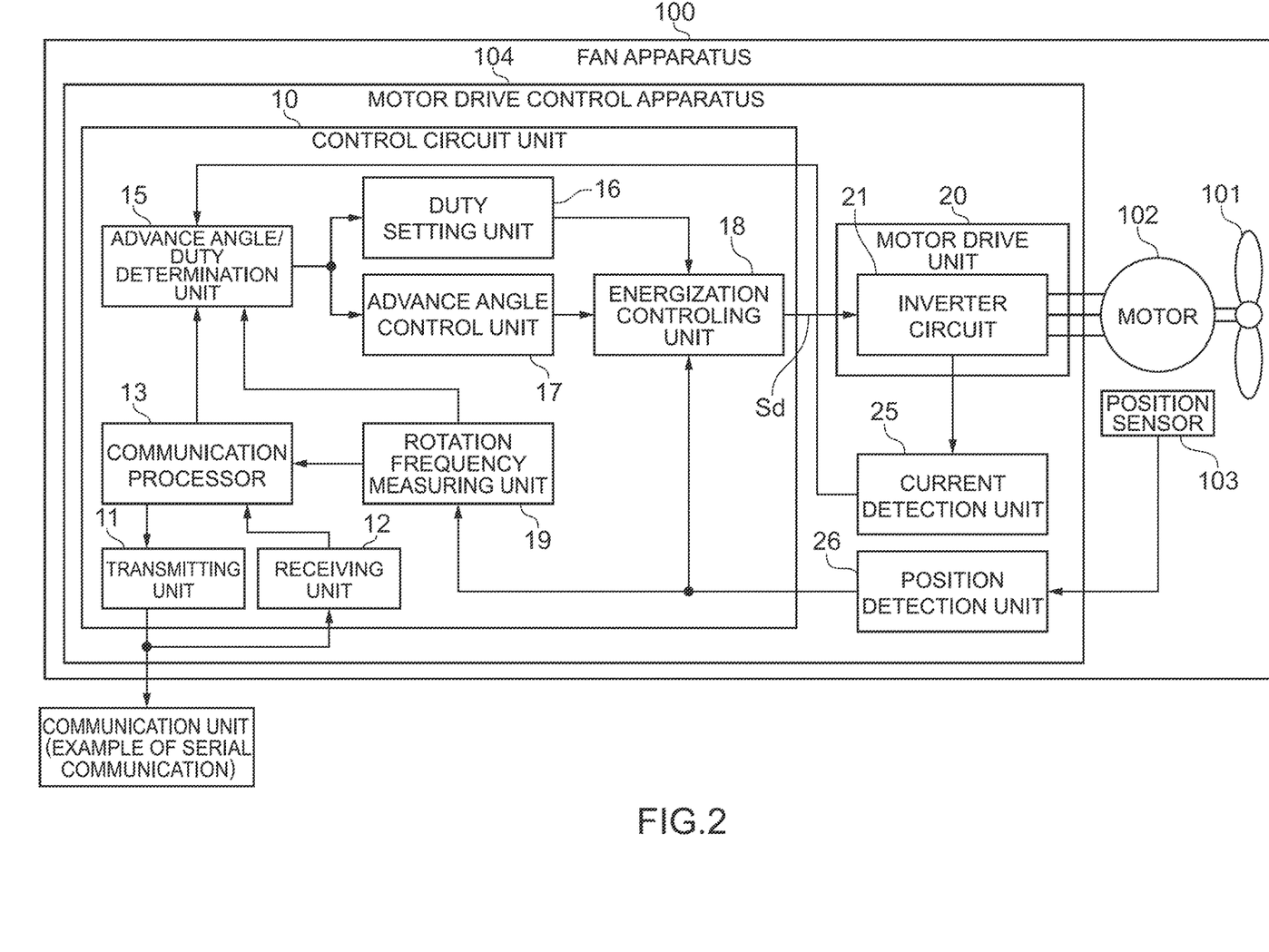
FIG. 2 is a schematic configuration diagram illustrating an example of a fan apparatus 100 of the motor drive system 1.

FIG. 2 is a schematic configuration diagram illustrating an example of the fan apparatus 100 of the motor drive system 1. The fan apparatus 100 is provided with the impeller 101, a motor 102, a position sensor 103 and a motor drive control apparatus 104.

In the fan apparatus 100, the impeller 101 is connected to the motor 102, and rotates as a rotor of the motor 102 rotates (also referred to as "rotation of the motor 102"). The motor 102 is made to rotate and drive by the motor drive control apparatus 104. For the motor 102, for example, a three-phase brushless motor can be used, but the type of the motor is not particularly limited and the number of phases is not limited to three either.

The position sensor 103 outputs a signal corresponding to a rotational position of the rotor in the motor 102 to the motor drive control apparatus 104. In the present embodiment, the motor drive control apparatus 104 estimates the rotational position of the rotor from an output signal of a hall element as the position sensor 103 and generates the rotational position signal of the rotor. The position sensor 103 is not limited to the hall element as long as it is a sensor that can identify the rotational position of the rotor in the motor 102. In the fan apparatus 100, the position sensor 103 may be omitted. That is, the fan apparatus 100 can be configured as a sensor-less type.

The motor drive control apparatus 104 drives the motor 102 to rotate by causing a rectangular wave shape drive current (also referred to as a "motor current") to flow through a three-phase armature coil of the motor 102 based on the rotational position signal of the rotor. The motor drive control apparatus 104 includes a control circuit unit 10 configured to generate a drive control signal Sd to control driving of the motor 102, a motor drive unit 20 including an inverter circuit 21 configured to cause a drive current to flow through the motor 102 based on the drive control signal Sd, a current detection unit 25 configured to detect the drive current of the motor drive unit 20 and a position detection unit 26 configured to detect a rotational position of the rotor based on the output signal from the position sensor 103 and generate the rotational position signal.

When, a target rotation frequency is instructed from a host apparatus such as the control apparatus 30, the control circuit unit 10 outputs the drive control signal Sd to control the driving of the motor drive unit 20 so that the rotation of the motor 102 becomes the target rotation frequency. When a notification request for the actual rotation frequency (also referred to as a "current rotation frequency") is received from the host apparatus such as the control apparatus 30, the control circuit unit 10 notifies the control apparatus 30 of the actual rotation frequency of the motor 102 per current unit time. Furthermore, when the control circuit unit 10 receives stability information indicating that the actual rotation frequencies of the predetermined plurality of motors are stabilized, the control circuit unit 10 drives the motor to be the drive control target so that the motor current becomes minimum at the instructed target rotation frequency. Note that in this embodiment, the control circuit unit 10 receives a current adjustment enable signal to enable current to be adjusted from the control apparatus 30 as the stability information, more specifically, as a result of the actual rotation frequencies of the predetermined plurality of motors being stabilized.

The rotational position signal generated by the position detection unit 26 is inputted to the control circuit unit 10. A rotation frequency measuring unit 19 of the control circuit unit 10 can measure the actual rotation frequency, which is the actual rotation frequency per current unit time of the motor 102 based on the rotational position of the rotor obtained from the rotational position signal generated by the position detection unit 26. The measured actual rotation frequency is outputted by the rotation frequency measuring unit 19 in the control circuit unit 10 to a communication processing unit 13 and an advance angle/duty determination unit 15.

The motor drive unit 20 includes the inverter circuit 21 and the inverter circuit 21 causes a drive current to flow through the motor 102 based on the drive control signal Sd outputted from the control circuit unit 10.

The current detection unit 25 detects the drive current from the inverter circuit 21 as a motor current and inputs the drive current to the advance angle/duty determination unit 15 of the control circuit unit 10.

The control circuit unit 10 is constructed of a program processing apparatus (e.g., microcontroller: MCU) including hardware elements, for example, a processor such as a CPU, various memories such as a ROM and a RAM, a timer (counter), an A/D conversion circuit, an input/output I/F circuit, a clock generation circuit and the like, with the respective components interconnected via a bus or a dedicated line.

The control circuit unit 10 performs various calculations by the processor according to a program stored in a storage apparatus (not shown) such as a memory, controls peripheral circuits such as the A/D conversion circuit and the input/output I/F circuit to thereby realize the configuration of the respective functional units shown in FIG. 2. That is, as shown in FIG. 2, the control circuit unit 10 is provided with a transmitting unit 11, a receiving unit (an example of the rotation frequency instruction receiving unit, an example of the stability information receiving unit) 12, the communication processing unit 13, the advance angle/duty determination unit 15 (part of the motor current adjustment unit), a duty setting unit (part of the motor current adjustment unit) 16, an advance angle control unit (part of the motor current adjustment unit) 17, a energization controlling unit (part of the motor current adjustment unit, an example of the drive control signal generation unit) 18 and the rotation frequency measuring unit 19 as the functional units.

The transmitting unit 11 transmits an arbitrary signal to the host apparatus such as the control apparatus 30, the receiving unit 12 receives an arbitrary signal from the host apparatus such as the control apparatus 30. The transmitting unit 11 and the receiving unit 12 are interfaces controlled by the communication processing unit 13 and configured to transmit or receive predetermined contents. The receiving unit 12 can function as the rotation frequency instruction receiving unit and the stability information receiving unit.

When the communication processing unit 13 receives an instruction of a target rotation frequency of a motor to be a drive control target from the host apparatus such as the control apparatus 30, the communication processing unit 13 notifies the advance angle/duty determination unit 15 of the target rotation frequency. When the communication processing unit 13 receives a notification request of the rotation frequency from the host apparatus such as the control apparatus 30, the communication processing unit 13 transmits the actual rotation frequency information, which is information indicating the actual rotation frequency of the motor 102 received from the rotation frequency measuring unit 19 to the notification requester via the transmitting unit 11. Furthermore, when the communication processing unit 13 receives stability information indicating that the actual rotation frequencies of the predetermined plurality of motors are stabilized from the host apparatus such as the control apparatus 30 via the receiving unit 12, the communication processing unit 13 determines that current adjustment has been enabled, and notifies the advance angle/duty determination unit 15 that the current adjustment has been enabled (stability information has been received).

In FIG. 2, the advance angle/duty determination unit 15, the duty setting unit 16, the advance angle control unit 17 and the energization controlling unit 18 function as the motor current adjustment unit. The motor current adjustment unit is the functional unit configured to adjust, when a current adjustment enable signal is received as stability information, a drive control signal Sd for controlling the driving of the motor to be a drive control target so as to minimize the motor current at the target rotation frequency.

The advance angle/duty determination unit 15 functions as the advance angle/duty determination unit. The advance angle/duty determination unit configured to determine a predetermined advance angle value corresponding to the target rotation frequency and a duty ratio adjusted so as to reach the target rotation frequency as a combination of the advance angle value and the duty ratio of the drive control signal Sd until the stability information is received. The advance angle/duty determination unit configured to determine, when the stability information is received, a combination of the advance angle value and the duty ratio of the drive control signal Sd with which the motor current becomes minimum at the target rotation frequency.

Until the stability information is received, the advance angle/duty determination unit 15 outputs the advance angle value of the drive control signal Sd predetermined as the advance angle value of the drive control signal Sd corresponding to the target rotation frequency to the advance angle control unit 17 and outputs an arbitrary duty ratio to the duty setting unit 16. A combination of the target rotation frequency and the corresponding advance angle value of the drive control signal Sd may be stored in a memory (not shown) and the advance angle value of the drive control signal Sd predetermined as the advance angle value of the drive control signal Sd corresponding to the target rotation frequency can be determined with reference to this memory. An arbitrary duty ratio is determined to such a value that the fed back rotation frequency of the motor 102 converges to the target rotation frequency. A rotation frequency acquired from the rotation frequency measuring unit 19 can be used as the actual rotation frequency of the motor 102.

An adjustment of the advance angle value of the drive control signal Sd will be described here. In general, as the rotation frequency of a motor increases, an efficiency decrease due to a phase delay of the coil current with respect to an applied voltage becomes a problem. The advance angle value of the drive control signal Sd according to the present disclosure indicates an extent to which the rising timing of a pulse of the drive control signal Sd generated, for example, as a PWM signal is set earlier than reference timing to achieve advance angle control that sets earlier the energization timing of the drive current outputted at the inverter circuit 21 of the motor drive unit 20.

When the advance angle/duty determination unit 15 receives stability information outputted from the control apparatus 30 via the receiving unit 12 and the communication information unit 13, the advance angle/duty determination unit 15 determines the combination of the advance angle value and the duty ratio of the drive control signal Sd at which the motor current becomes minimum at the target rotation frequency based on the current (motor current) of the inverter circuit 21 detected by the current detection unit 25. Based on the motor current, the advance angle/duty determination unit 15 changes the advance angle value and the duty ratio of the drive control signal Sd within a range in which the actual rotation frequency of the motor does not deviate from the target rotation frequency to find a combination of the advance angle value and the duty ratio where that the motor current becomes minimum and determines the found combination of the advance angle value and duty ratio as the combination of the advance angle value and the duty ratio of the drive control signal Sd for minimizing the motor current at the target rotation frequency. In the present description, the technique of determining this combination of the advance angle value and the duty ratio of the drive control signal Sd is called "current feedback control." The actual rotation frequency of the motor at this time may precisely match the target rotation frequency, or may be substantially the target rotation frequency and may fall within a predetermined numerical value range using the target rotation frequency as a reference (±α % or the like of target rotation frequency).

When the current feedback control is completed, the advance angle/duty determination unit 15 can notify the control apparatus 30 accordingly via the communication processing unit 13 and the transmitting unit 11.

The advance angle/duty determination unit 15 preferably performs current feedback control within a predetermined time in accordance with reception of a current adjustment enable signal as the stability information outputted from the control apparatus 30. In this way, it is possible to perform current feedback control while the actual rotation frequency of another motor remains surely stable.

When the advance angle/duty determination unit 15 acquires an adjustment end instruction that requests an end of execution of the current feedback control outputted from the control apparatus 30, the advance angle/duty determination unit 15 preferably ends the execution of the current feedback control. In this way, when the actual rotation frequency of another motor becomes unstable, the control apparatus 30 can recognize the unstable actual rotation frequency, stop the current feedback control and thereby prevent inappropriate adjustment.

The energization controlling unit 18 functions as a drive control signal generation unit configured to generate the drive control signal Sd based on the combination of the advance angle value and the duty ratio of the drive control signal Sd determined by the duty setting unit 16 and the advance angle control unit 17.

The duty setting unit 16 and advance angle control unit 17 notify the energization controlling unit 18 of the determined advance angle value and duty ratio of the drive control signal Sd. The energization controlling unit 18 generates a drive control signal Sd to control driving of the inverter circuit 21 of the motor drive unit 20 at the notified advance angle value and duty ratio. The energization controlling unit 18 can take timing of generating the drive control signal Sd based on the rotational position signal generated in the position detection unit 26. The energization controlling unit 18 refers to the rotational position signal generated by the position detection unit 26 based on the determined advance angle value of the drive control signal Sd, controls and outputs the drive control signal Sd so that the phase of the drive signal of the inverter circuit 21 becomes a predetermined advance angle value. Furthermore, the energization controlling unit 18 controls and outputs the duty ratio of the drive control signal Sd generated, for example, as a PWM signal based on the duty ratio of the drive control signal Sd.

Figure 3:
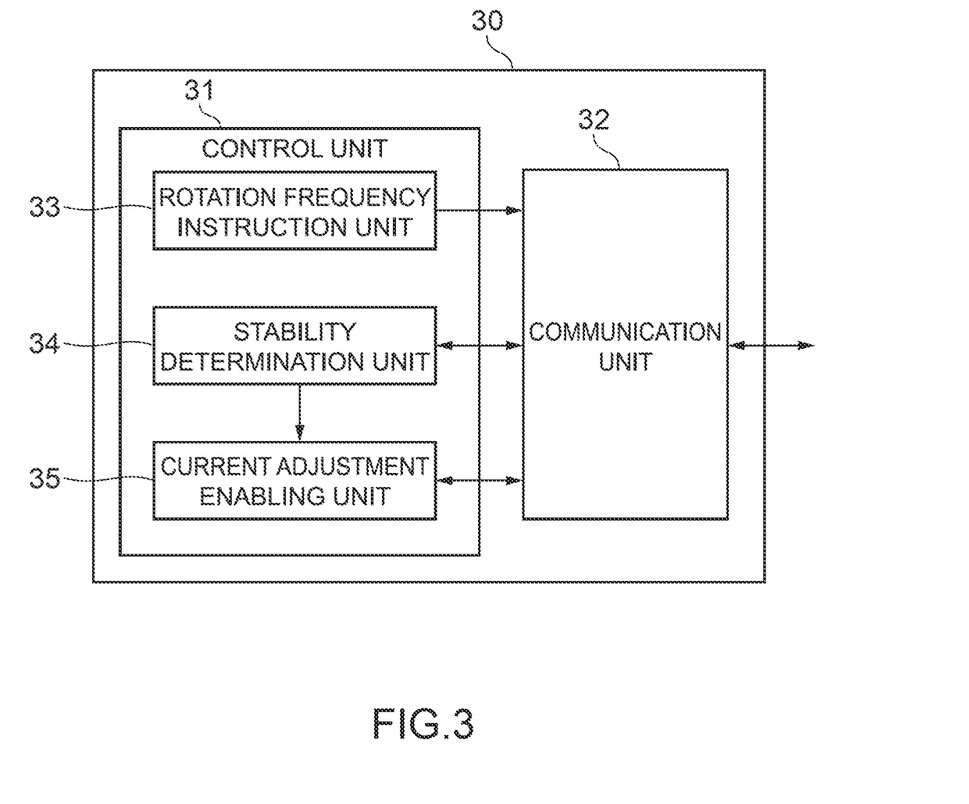
FIG. 3 is a schematic configuration diagram illustrating an example of a control apparatus 30 used in the motor drive system 1.

FIG. 3 is a schematic configuration diagram illustrating an example of the control apparatus 30 used in the motor drive system 1. In FIG. 3, the control apparatus 30 is provided with a control unit 31 and a communication unit 32. The control unit 31 is constructed of a program processing apparatus (e.g., microcontroller: MCU) including hardware elements, a processor such as a CPU, various memories such as a ROM and a RAM, a timer (counter), an A/D conversion circuit, an input/output I/F circuit, a clock generation circuit, and the like, with the respective components interconnected via a bus or a dedicated line, and includes a rotation frequency instruction unit 33, a stability determination unit 34 and a current adjustment enabling unit 35 as functional units.

The communication unit 32 is a communication terminal connected to the communication line 5 or a wireless communication interface that performs wireless communication.

The rotation frequency instruction unit 33 outputs target rotation frequency information to the four fan apparatuses 100a to 100d, which are control targets. The stability determination unit 34 determines whether all the four fan apparatuses 100a to 100d are stably rotating (stability operation) or not. Specifically, the stability determination unit 34 requests actual rotation frequency information from all the four fan apparatuses 100a to 100d and determines, when all the actual rotation frequencies of all the four motors acquired in response to the request are included within a predetermined numerical value range with respect to the target rotation frequency of each motor, that the actual rotation frequencies of all the four motors are stabilized.

When the stability determination unit 34 determines that the actual rotation frequencies of all the four motors are stabilized, the current adjustment enabling unit 35 generates as stability information, a current adjustment enable signal to enable the drive control signal Sd to be adjusted so that the motor currents sequentially become minimum for all the four fan apparatuses 100a to 100d (motor drive control apparatus 104 of the motor 102). The current adjustment enabling unit 35 specifies any one of all the four fan apparatuses 100a to 100d and transmits stability information to the communication unit 32. However, the current adjustment enabling unit 35 does not transmit the next stability information until it receives a completion notice from the fan apparatus 100 that has been notified of the stability information via the communication unit 32. What is important here is that current adjustment be sequentially enabled for all the four fan apparatuses 100a to 100d. In other words, the current adjustment is never enabled for the four motors 102 simultaneously. It is thereby possible to adjust the drive control signal Sd so that the motor currents of the respective motors 102 of all the four fan apparatuses 100a to 100d become minimum under no influence from the other motors 102.

If the actual rotation frequency of the motor 102 in any fan apparatus 100 not to be currently notified becomes unstable while the current adjustment enabling unit 35 has not received any completion notice after the last notice of stability information by the communication unit 32, the current adjustment enabling unit 35 can notify the fan apparatus 100 to be currently notified of an adjustment end instruction for requesting the end of execution of current feedback control via the communication unit 32. In this way, when the actual rotation frequency of another motor becomes unstable, the control apparatus 30 can recognize the unstable actual rotation frequency, stop the current feedback control and thereby avoid inappropriate adjustment.

Figure 4:
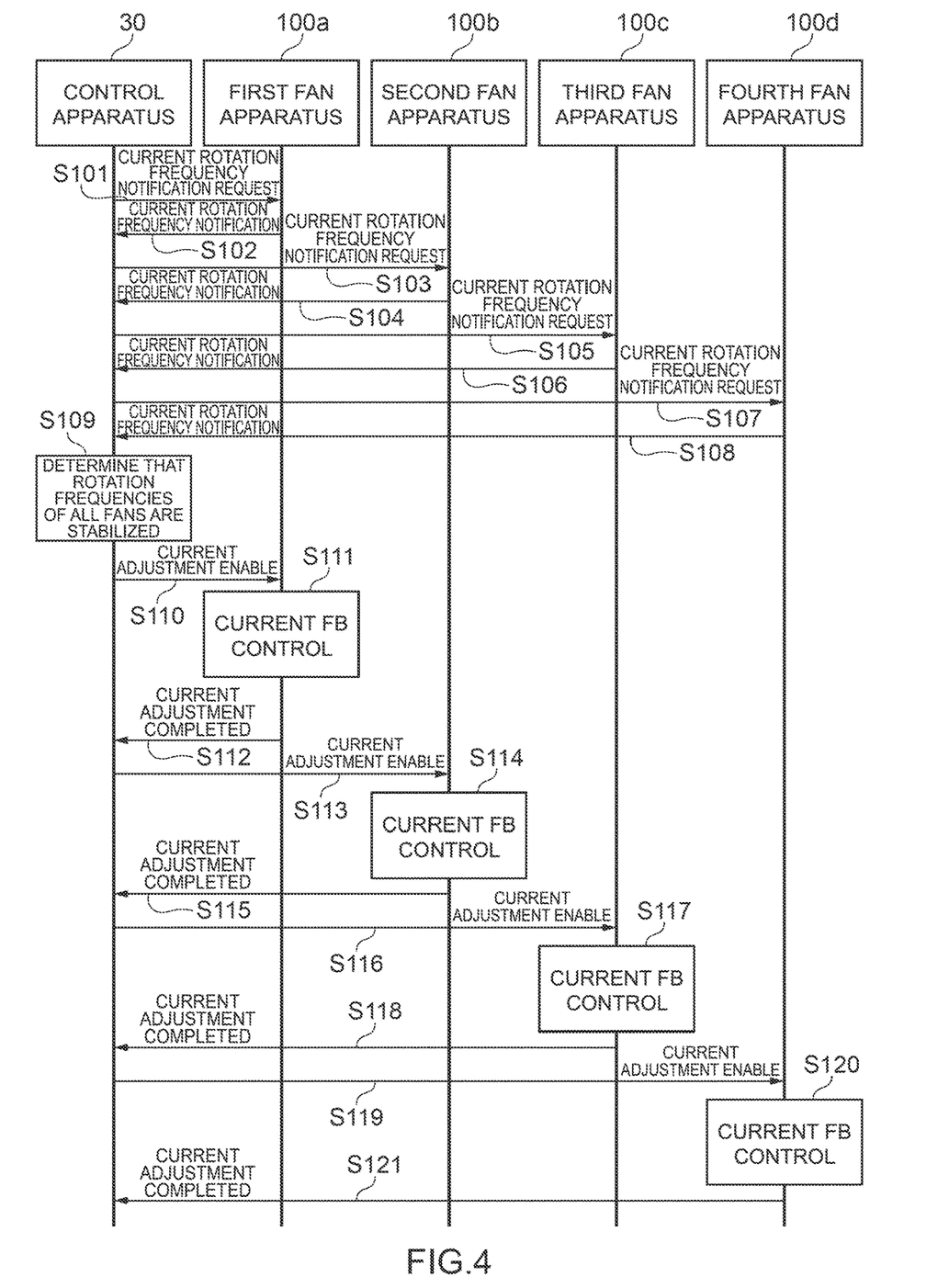
FIG. 4 is a diagram illustrating an example of communication sequence between the control apparatus 30 and each fan apparatus 100a to 100d.

Thereafter, operation of the aforementioned motor drive system 1 will be described. FIG. 4 is a diagram illustrating an example of communication sequence between the control apparatus 30 and each fan apparatus 100 (fan apparatus 100a to 100d). Prior to the sequence shown in FIG. 4, the control apparatus 30 has notified each fan apparatus 100 of the target rotation frequency and each fan apparatus 100 has adjusted the duty ratio of the drive control signal Sd so as to reach the notified target rotation frequency.

The control apparatus 30 is requesting the first fan apparatus 100a, the second fan apparatus 100b, the third fan apparatus 100c and the fourth fan apparatus 100d to notify current rotation frequencies (actual rotation frequencies) (steps S101, S103, S105 and S107). The first fan apparatus 100a, the second fan apparatus 100b, the third fan apparatus 100c and the fourth fan apparatus 100d that have received the requests acquire the current rotation frequencies of the motors 102 and send the current rotation frequencies back to the control apparatus 30 (steps S102, S104, S106 and S108). Note that the processes in step S101 to step S108 need not exclusively follow the order shown in the diagram, but may be executed simultaneously.

When the control apparatus 30 can determine that the current rotation frequencies of all the motors 102 are stable (step S109), the control apparatus 30 transmits a current adjustment enable signal to the first fan apparatus 100a (step S110).

Upon receipt of the current adjustment enable signal, the first fan apparatus 100a executes current feedback control (also referred to as "current FB control") (step S111). Here, the current FB control will be described using FIG. 5.

Figure 5:
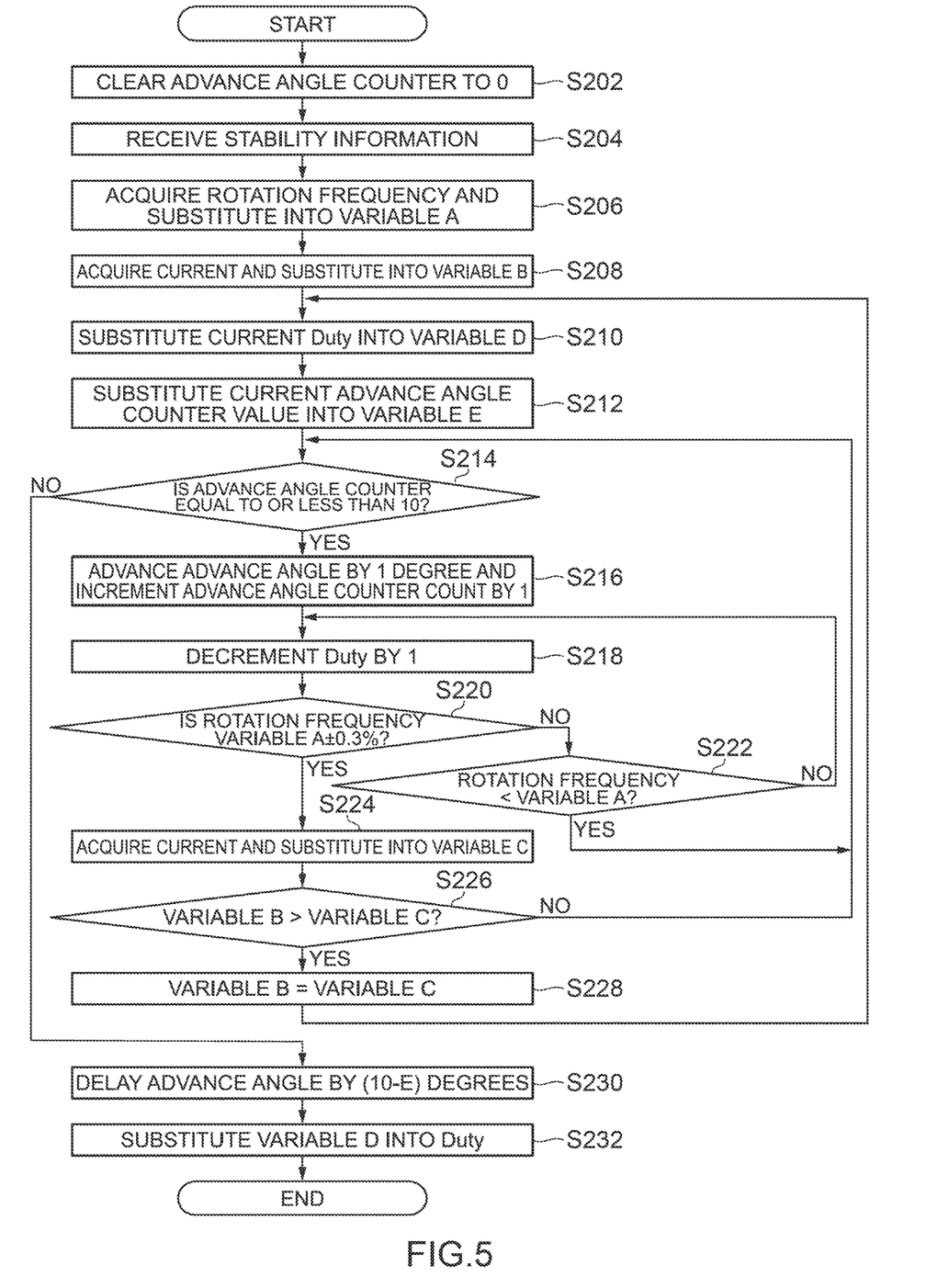
FIG. 5 is an example of a flowchart illustrating operation of current feedback control.

FIG. 5 is an example of a flowchart illustrating operation of the current feedback control. The current FB control is executed by the advance angle/duty determination unit 15 of the fan apparatus 100. The advance angle/duty determination unit 15 includes an advance angle counter that expresses as a count value, a degree of an advance angle value of the drive control signal Sd using, for example, an arbitrary predetermined angle as a unit. The advance angle/duty determination unit 15 stores the current rotation frequency of the motor 102 as a variable A, the motor current as a variable B, the adjusted motor current as a variable C, the duty ratio of the current drive control signal Sd as a variable D and the value of the current advance angle counter as a variable E.

In this operation example, a case will be described where current feedback control is performed within a range until the advance angle counter reaches "10," but the range is not particularly limited. The advance angle counter is not limited to one that counts "1 degree" at a time, but an arbitrary advance angle value may be used. The duty ratio is adjusted by "1" at a time, but the value adjusted is not particularly limited. Note that the numerical value "1" in the present disclosure expresses a minimum value of resolution.

The advance angle/duty determination unit 15 clears the advance angle counter count to "0" in advance (step S202). When the advance angle/duty determination unit 15 receives a current adjustment enable signal (stability information) (step S204), the advance angle/duty determination unit 15 acquires the actual rotation frequency received from the rotation frequency measuring unit 19, substitutes the acquired actual rotation frequency into the variable A as a current rotation frequency (step S206), substitutes the current received from the current detection unit 25 into the variable B (step S208), substitutes the last determined duty ratio into the variable D (step S210), and substitutes the last determined advance angle value into the variable E (step S212).

Next, the advance angle/duty determination unit 15 confirms that the value of the current advance angle counter is "10" or below (step S214: Yes), advances the advance angle value by "1 degree," increments the advance angle counter by "1" (step S216) and decrements Duty by "1" (step S218).

At this time, the duty setting unit 16 and the advance angle control unit 17 output the advance angle value and the duty ratio determined in step S216 and step S218 to the energization controlling unit 18, and the energization controlling unit 18 outputs the drive control signal Sd generated based on the inputted advance angle value and duty ratio to the motor drive unit 20. Driven by the motor drive unit 20 based on the drive control signal Sd, the motor 102 rotates. Information on the current rotation frequency of the motor 102 at this time can be acquired from the actual rotation frequency inputted to the advance angle/duty determination unit 15 via the position sensor 103, the position detection unit 26 and the rotation frequency measuring unit 19. The motor current at this time is detected by the current detection unit 25 that detects the current of the inverter circuit 21 and is inputted to the advance angle/duty determination unit 15.

After step S218, the advance angle/duty determination unit 15 determines whether the obtained current rotation frequency of the motor 102 is a value within ±0.3% of the variable A substituted as the previous current rotation frequency of the motor 102 or not (step S220). When the determination is "No," the advance angle/duty determination unit 15 determines whether the obtained current rotation frequency of the motor 102 is smaller than the value of the variable A or not (step S222). When the obtained current rotation frequency of the motor 102 is equal to or larger than the value of the variable A (step S222: No), the flow returns to step S218 to adjust the duty ratio. When the obtained current rotation frequency of the motor 102 is smaller than the value of the variable A (S222: Yes), the flow returns to step S214 to confirm the advance angle counter.

When the determination is "Yes" in step S220, the advance angle/duty determination unit 15 acquires the motor current, substitutes the motor current into the variable C (step S224), and determines whether the variable B is larger than the variable C (step S226). When it is determined that the variable B is not larger than the variable C (step S226: No), the flow returns to step S214 again. When it is determined that the variable B is larger than the variable C (step S226: Yes), the advance angle/duty determination unit 15 substitutes the variable C into the variable B (S228), the flow returns to step S210, and the advance angle/duty determination unit 15 updates the variable D and the variable E to new values respectively. In this way, a minimum motor current is stored as the variable B, updating can be done in the combination of the advance angle value and the duty ratio of the drive control signal Sd when the motor current becomes smaller than this value.

In step S214, when it is determined that the advance angle counter is not equal to or less than 10 (step S214: No), the advance angle/duty determination unit 15 delays the advance angle value by (10-E) degrees (step S230) to thereby set an optimum advance angle value, and outputs this optimum advance angle value to the advance angle control unit 17. The advance angle/duty determination unit 15 outputs the value of the variable D to the duty setting unit 16 as an optimum duty ratio of the drive control signal Sd (step S232).

When the motor current is set to be minimum at the target rotation frequency by the above current feedback control, the first fan apparatus 100a notifies the control apparatus 30 of the completion of the current adjustment by means of the communication processing unit 13 (step S112).

When the control apparatus 30 receives a response regarding the completion of current adjustment from the first fan apparatus 100a, the control apparatus 30 transmits a current adjustment enable signal to the second fan apparatus 100b (step S113). The second fan apparatus 100b also performs current feedback control similar to the current feedback control in FIG. 5 (step S114) and notifies the control apparatus 30 of the response regarding the completion of current adjustment (step S115).

When the control apparatus 30 receives the response regarding the completion of current adjustment from the second fan apparatus 100b, the control apparatus 30 transmits a current adjustment enable signal to the third fan apparatus 100c (step S116). The third fan apparatus 100c also performs current feedback control similar to the current feedback control in FIG. 5 (step S117) and notifies the control apparatus 30 of the response regarding the completion of current adjustment (step S118).

When the control apparatus 30 receives the response regarding the completion of current adjustment from the third fan apparatus 100c, the control apparatus 30 transmits a current adjustment enable signal to the fourth fan apparatus 100d (step S119). The fourth fan apparatus 100d also performs current feedback control similar to the current feedback control in FIG. 5 (step S120) and notifies the control apparatus 30 of a response regarding the completion of current adjustment (step S121).

In this way, a current adjustment enable signal is always transmitted on condition that a response regarding the completion of current adjustment is notified except the first transmission. Thus, according to the motor drive system 1 of the present embodiment, current feedback control is never performed on the plurality of fan apparatuses 100a to 100d simultaneously, and so the current feedback control can be performed without being affected by load fluctuations due to rotation fluctuations of the other motors. That is, according to the motor drive system 1 of the present embodiment, it is possible to adjust the drive control signal Sd to control driving of the motor to be a drive control target by performing current feedback control so as to minimize the motor current without being affected by load fluctuations due to rotation fluctuations of the other motors. As a result, it is possible to optimize drive efficiency of each of the plurality of motors to be driven simultaneously.

Modifications of Embodiments

In the above embodiments, stability information from the control apparatus 30 is notified to one fan apparatus specified from among the plurality of fan apparatuses 100a to 100d, and current feedback control is performed triggered by only the specified fan apparatus 100 having received the stability information. However, in the control apparatus 30, stability information may be notified without specifying one fan apparatus from among the plurality of fan apparatuses 100a to 100d, and each fan apparatus 100 may spontaneously declare to perform current feedback control. In this case, when the communication processing unit 13 of the fan apparatus 100 declares to perform current feedback control and the current adjustment enabling unit 35 of the control apparatus 30 receives the declaration, the other fan apparatuses 100 may be notified that execution of the current feedback control is prohibited or the communication processing unit 13 of the fan apparatus 100 may receive a declaration to execute current feedback control from the other fan apparatuses 100 so that the fan apparatus 100 itself may not declare to execute current feedback control until it receives a notice of completion of the current feedback control.

In the above embodiments, specific examples of the method for controlling the motor drive control apparatus in FIG. 5 have been described using the motor drive control apparatus with the configuration in FIG. 2. However, the configuration of the motor drive control apparatus and the method for controlling the motor drive control apparatus are not particularly limited to the described examples. For example, in the motor drive control apparatus 104 in FIG. 2, the actual rotation frequency of the motor 102 is measured by the rotation frequency measuring unit 19 based on a rotational position signal from the position detection unit 26. It is also possible to provide a configuration in which the rotational frequency of the motor 102 is measured based on a rotational position signal from the position detection unit 26 instead of the rotation frequency measuring unit 19. In this case, the communication processing unit 13 and the advance angle/duty determination unit 15 may perform various processes after converting the rotational frequency of the motor 102 to an actual rotation frequency of the motor 102.

The configuration of the control apparatus 30 in FIG. 3 and the sequence in FIG. 4 are also examples, and the configuration and the sequence are not limited to these examples. For example, the stability determination unit 34 in the control apparatus 30 determines stable operation from the rotation frequency information of the motor 102 received from each fan apparatus 100, but it may also be possible to provide a configuration in which information other than the actual rotation frequency such as a temperature and a wind amount is acquired and input the information to the stability determination unit 34, and include the information in the criteria for stable operation. Furthermore, for example, the stability determination unit 34 determines the stability operation based on the fact that the actual rotation frequencies of all the fan apparatuses 100 are stabilized, whereas the stability determination unit 34 may determine the stability operation based on the fact that the actual rotation frequencies of the fan apparatuses 100 other than an arbitrary one fan apparatus 100 is stabilized and notify the current adjustment enabling unit 35 of the fact. When the current adjustment enabling unit 35 receives a notice that the actual rotation frequencies of the fan apparatuses 100 other than an arbitrary one fan apparatus 100 are stabilized, the current adjustment enabling unit 35 can notify the stability information specifying the arbitrary one fan apparatus 100. Furthermore, the stability determination unit 34 may continue to determine the stability operation of each fan apparatus 100 even after determining the stability operation once. This is because even after stable operation is achieved once, the actual rotation frequency of each fan apparatus may further become unstable.

The scheme of communication carried out between the control apparatus and each motor drive control apparatus is not limited. Although an example has been described in the above embodiments where serial communication is performed, for example, parallel communication may also be performed. When the communication line 5 between the control apparatus and each motor drive control apparatus is wired communication, the communication may be single direction communication using one communication line or may be bidirectional communication using one communication line. In the case of the bidirectional communication, the communication may not be limited to the single line scheme, but two-line communication in which different lines are used for transmission and reception may also be performed.

What is claimed is:

1. A motor drive control apparatus comprising:
a rotation frequency instruction receiving unit configured to receive a target rotation frequency outputted to a motor to be a drive control target among a predetermined plurality of motors from a host apparatus;
a stability information receiving unit configured to receive stability information indicating that actual rotation frequencies of the predetermined plurality of motors are stabilized;
a motor current adjustment unit configured to adjust, when the stability information is received, a drive control signal to control driving of the motor to be the drive control target so that the motor current becomes minimum at the target rotation frequency;
a motor drive unit configured to drive the motor to be the drive control target based on the drive control signal, and
a transmitting unit configured to transmit a completion notification to the host apparatus when the motor current adjustment unit having received the stability information has completed the adjustment of the drive control signal, wherein
the stability information is a current adjustment enable signal for sequentially enabling the adjustment of the drive control signal so as to minimize the motor current of the motor to be the drive control target,
the stability information is sent from the host apparatus to the predetermined plurality of motors when the actual rotation frequencies of all of the predetermined plurality of motors are stabilized, and
the stability information is not sent from the host apparatus to another motor selected from the predetermined plurality of motors until the completion notification of the adjustment of the drive control signal is transmitted from the transmitting unit of the motor drive control apparatus corresponding to the motor that has received the stability information.

2. The motor drive control apparatus according to claim 1, wherein the motor current adjustment unit adjusts the drive control signal so as to minimize the motor current within a predetermined time upon receipt of the current adjustment enable signal.

3. The motor drive control apparatus according to claim 1, wherein when the motor current adjustment unit acquires an adjustment end instruction for requesting the end of adjusting the drive control signal from the host apparatus, the motor current adjustment unit ends the adjustment of the drive control signal.

4. The motor drive control apparatus according to claim 1, wherein the motor current adjustment unit comprises:
an advance angle/duty determination unit configured to determine a predetermined advance angle value corresponding to the target rotation frequency and a duty ratio adjusted to be the target rotation frequency corresponding to the target rotation frequency as a combination of the advance angle value and the duty ratio of the drive control signal until the stability information is received and determine a combination of the advance angle value and the duty ratio of the drive control signal where the motor current becomes minimum at the target rotation frequency when the stability information is received; and
a drive control signal generation unit configured to generate the drive control signal based on the combination of the advance angle value and the duty ratio of the determined drive control signal.

5. A motor drive system comprising:
the predetermined plurality of motors;
motor drive control apparatuses according to claim 1 provided for the predetermined plurality of motors respectively; and
the host apparatus comprising a rotation frequency instruction unit configured to output a target rotation frequency of the motor to be the drive control target of the motor drive control apparatus to the motor drive control apparatus.

6. A method for controlling the motor drive control apparatus according to claim 1, comprising:
a rotation frequency instruction reception step of receiving the target rotation frequency outputted to the motor to be the drive control target among the predetermined plurality of motors from the host apparatus;
a stability information reception step of receiving the stability information indicating that the actual rotation frequencies of the predetermined plurality of motors are stabilized;
a motor current adjustment step of adjusting, after the stability information reception step, the drive control signal to control driving of the motor to be the drive control target so that the motor current becomes minimum at the target rotation frequency; and
a motor drive step of driving the motor to be the drive control target based on the drive control signal.

7. The motor drive system according to claim 5, wherein the host apparatus comprises:
a stability determination unit configured to request actual rotation frequency information from the motor drive control apparatuses of the predetermined plurality of motors and determine, when all the actual rotation frequencies of the predetermined plurality of motors acquired in response to the request fall within a predetermined numerical value range with respect to the target rotation frequency of each motor, that the actual rotation frequencies of the predetermined plurality of motors are stabilized; and a current adjustment enabling unit configured to generate the current adjustment enable signal to sequentially enable drive control signals to be adjusted so as to minimize the motor current for the motor drive control apparatuses of the predetermined plurality of motors when the stability determination unit determines that the actual rotation frequencies of the predetermined plurality of motors are stabilized.

\* \* \* \* \*